(12) United States Patent
Kim et al.

(10) Patent No.: US 9,566,725 B2
(45) Date of Patent: Feb. 14, 2017

(54) SYSTEM FOR MANUFACTURING CORE OF VACUUM INSULATION PANEL

(71) Applicant: OCI Company Ltd., Seoul (KR)

(72) Inventors: Hae Duck Kim, Jeollabuk-do (KR); Hyun Cheol Kim, Incheon (KR); SinSup Lim, Jeollabuk-do (KR)

(73) Assignee: OCI COMPANY LTD., Seoul (KR)

(*) Notice: Subject to any disclaimer, the term of this patent is extended or adjusted under 35 U.S.C. 154(b) by 555 days.

(21) Appl. No.: 14/074,446

(22) Filed: Nov. 7, 2013

(65) Prior Publication Data

US 2014/0127346 A1 May 8, 2014

(30) Foreign Application Priority Data

Nov. 7, 2012 (KR) .......... 10-2012-0125370
Nov. 15, 2012 (KR) .......... 10-2012-0129401

(51) Int. Cl.
*B29C 43/04* (2006.01)
*B29C 43/02* (2006.01)
(Continued)

(52) U.S. Cl.
CPC ............. *B29C 43/02* (2013.01); *B29C 59/022* (2013.01); *B29D 99/0021* (2013.01);
(Continued)

(58) Field of Classification Search
CPC ........ B30B 9/3085; B30B 11/04; B30B 11/14; B30B 15/302; B30B 15/0017; B30B 15/062; B30B 9/3075; B30B 9/3096; B29C 59/022; B29C 43/02; F16L 59/065; B29D 99/0021; Y10T 428/24612; Y10T 428/24479
(Continued)

(56) References Cited

U.S. PATENT DOCUMENTS 3,907,474 A 9/1975 Blaser et al.
5,648,033 A * 7/1997 Bogue .............. A23G 3/10
264/109
(Continued)

FOREIGN PATENT DOCUMENTS

GB 1183354 A 3/1970
GB 1445736 A 8/1976
(Continued)

OTHER PUBLICATIONS

Chinese Office Action dated Jul. 15, 2015, in Chinese Application No. 201310551738.2.

*Primary Examiner* — Joseph S. Del Sole
*Assistant Examiner* — Thukhanh T Nguyen
(74) *Attorney, Agent, or Firm* — Saliwanchik, Lloyd & Eisenschenk

(57) ABSTRACT

Provided herein is a system for manufacturing a core of a vacuum insulation panel, the system comprising: a plurality of molding cast parts disposed along one direction, and providing a molding space for core material to be supplied and press-molded; a plurality of raw material suppliers distanced from one another, and supplying core material to the molding space; a press-molder disposed between the raw material suppliers, and receiving the molding cast part where the core material is supplied through the raw material supplier, and pressing the molding space; and a carrier transferring the molding cast part after the core material is supplied by the raw material supplier and the molding space is press-molded by the press-molder.

15 Claims, 7 Drawing Sheets

(51) Int. Cl.
- *B29D 99/00* (2010.01)
- *B29C 59/02* (2006.01)
- *B30B 9/30* (2006.01)
- *B30B 11/04* (2006.01)
- *B30B 11/14* (2006.01)
- *B30B 15/30* (2006.01)
- *B30B 15/00* (2006.01)
- *B30B 15/06* (2006.01)
- *F16L 59/065* (2006.01)

(52) U.S. Cl.
CPC .......... *B30B 9/3075* (2013.01); *B30B 9/3085* (2013.01); *B30B 9/3096* (2013.01); *B30B 11/04* (2013.01); *B30B 11/14* (2013.01); *B30B 15/0017* (2013.01); *B30B 15/062* (2013.01); *B30B 15/302* (2013.01); *F16L 59/065* (2013.01); *Y10T 428/24479* (2015.01); *Y10T 428/24612* (2015.01)

(58) Field of Classification Search
USPC .................................................. 425/500, 505
See application file for complete search history.

(56) References Cited

U.S. PATENT DOCUMENTS 6,383,446 B1* 5/2002 Tokita .................... B22F 3/003
                                                            419/38
7,883,330 B2* 2/2011 Inoue ..................... B30B 11/14
                                                            425/183

FOREIGN PATENT DOCUMENTS

| GB | 2351695 A | 1/2001 |
| JP | H02251400 A | 10/1990 |
| KR | 2011-0096658 A | 8/2011 |
| KR | 2012-0028048 A | 3/2012 |

* cited by examiner

Prior Art

FIG. 7
(a)
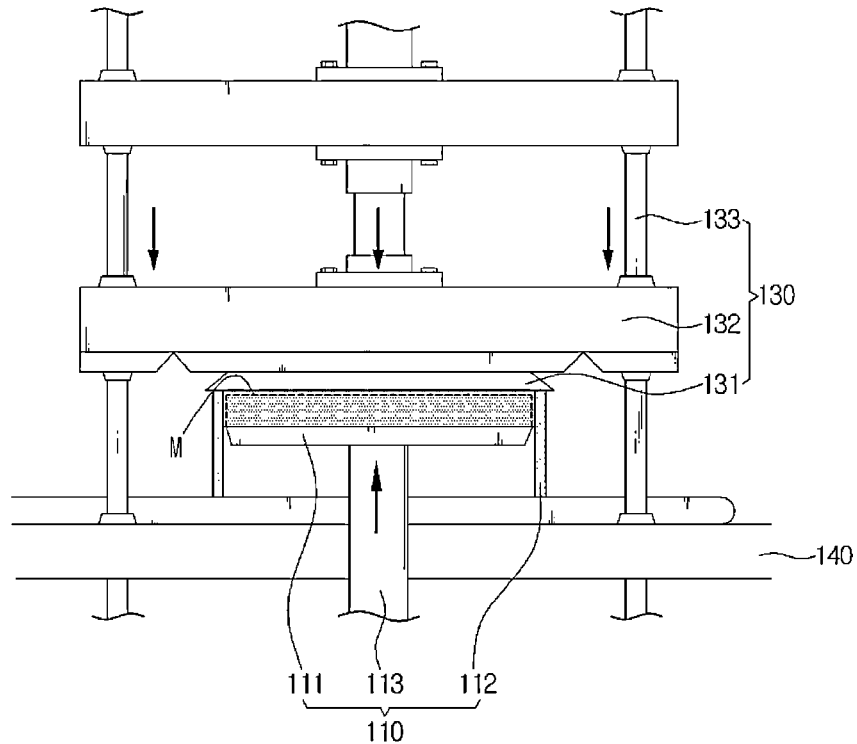
(b)
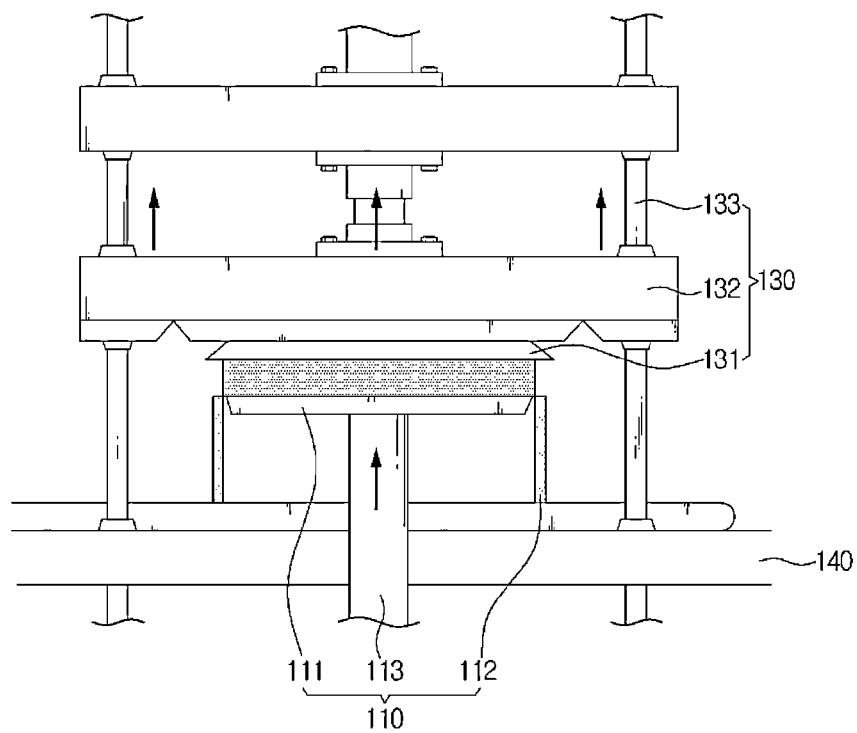

FIG. 8
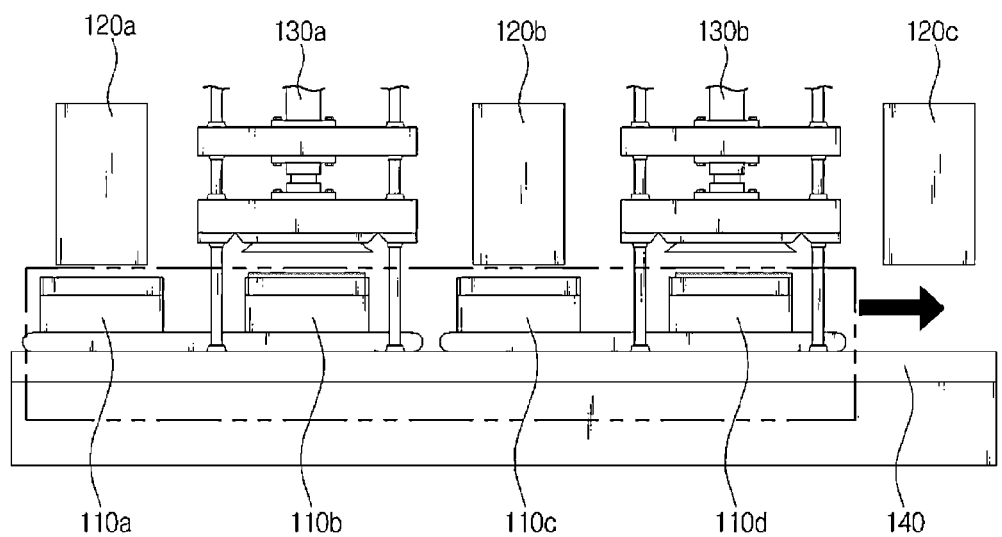
(a)
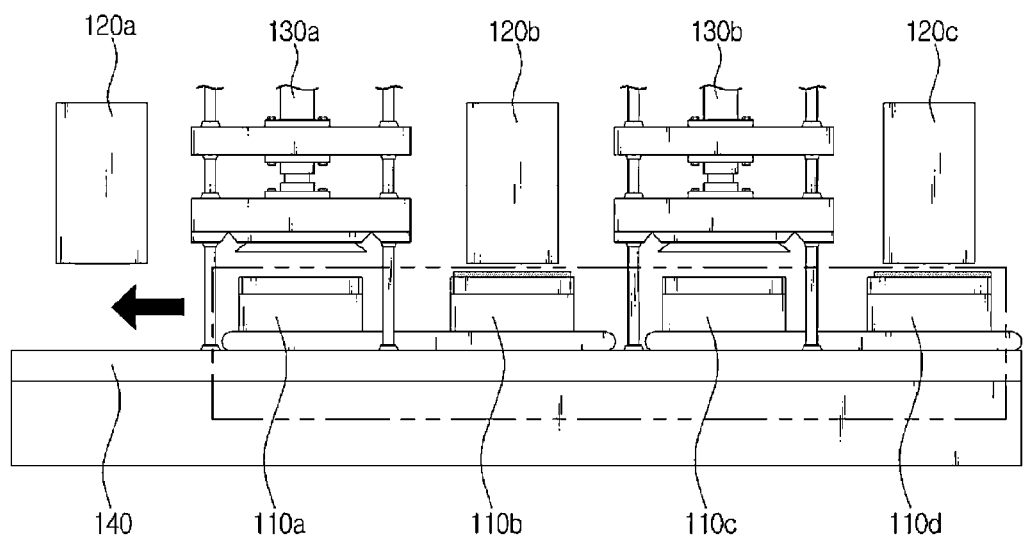
(b)

SYSTEM FOR MANUFACTURING CORE OF VACUUM INSULATION PANEL

CROSS-REFERENCE TO RELATED APPLICATIONS

This application claims the benefit under 35 U.S.C. §119 of Korean Patent Applications Nos. 10-2012-0125370 and 10-2012-0129401, filed on Nov. 7, 2012, and Nov. 15, 2012, respectively, which are hereby incorporated by reference in their entirety.

BACKGROUND

Field of the Invention

The following description relates to a system for manufacturing a core of a vacuum insulation panel, for example, to a system capable of mass-producing large size cores of vacuum insulation panels, but the system taking up minimized space.

Description of Related Art

Insulation panels are used to limit transference of heat in buildings, pipes, and ice boxes where there is temperature difference between the interior and exterior thereof. General insulation panels or vacuum insulation panels are mostly used for the above purpose.

A general insulation panel has an insulation performance of 30 mW/mK, whereas a vacuum insulation panel has a high insulation performance of 3~10 mW/mK, that is, approximately 3 to 10 times that of a general insulation panel. Such vacuum insulation panels are not widely used due to high material costs and difficulty of manufacturing technologies despite their excellent insulation performance.

Recently, due to significant advance of manufacturing technologies, various countries such as Germany, Great Britain, Japan, USA, Canada, Korea, and China etc. are making efforts to commercialize vacuum insulation panels, but high material costs and manufacturing process costs are becoming a burden.

A vacuum insulation panel consists of a molded insulation body made of inorganic substances and a packaging material covering the molded insulation body. The biggest feature of a vacuum insulation panel is that the interior of the molded insulation body is prepared in a vacuum condition. Herein, the molded insulation body that fills the inside of the vacuum insulation panel is called a core.

One way to manufacture a core is to use a glass fiber compressed material or mixed powder including silica. A core is molded by putting powder compressed material in a molding cast, and then pressing the powder compressed material with a molding machine, forming a core having a certain density, size and thickness.

Korean patent publication no. 10-2010-00900008 discloses a continuous rotating molding apparatus that is capable of reducing loss of raw material and reducing production time per core.

FIG. 1 is a schematic view of an apparatus for molding a vacuum insulation panel using a conventional continuous rotating molding cast.

With reference to FIG. 1, an apparatus 1 for molding a vacuum insulation panel using a conventional continuous rotating molding cast is provided with four molding casts 10 disposed by a distance of 90° from one another on a rotatably provided plate members, each molding cast 10 rotating 90° per process and provided to a raw material supplier 20, planarizer 21, press-molder 30, and discharger 40, discharging four press-molded cores per rotation of the plate member 5.

However, the apparatus 1 for molding a vacuum insulation panel using a continuous rotating molding cast is provided with four molding casts 10 on one plate member, and thus if the molding cast 10 is enlarged in order to mold an enlarged core, the rotating plate must be enlarged as well. This causes the burden of having to excessively enlarge the installation space for the apparatus.

In addition, since a series of molding process is performed in one plate member, when a failure occurs in at least one of the raw material supplier 20, planarizer 21, press-molder 30 and discharger 40, the entire molding apparatus stops its operation.

BRIEF SUMMARY

Therefore, a purpose of the present disclosure is to resolve the aforementioned problems of prior art, that is, to provide a system for manufacturing a core of a vacuum insulation panel that is capable of easily adjusting the size of the core being manufactured, reducing the manufacturing time of the core, and capable of being applicable to mass-production.

In a general aspect, there is provided system for manufacturing a core of a vacuum insulation panel, the system comprising: a plurality of molding cast parts disposed along one direction, and providing a molding space for core material to be supplied and press-molded; a plurality of raw material suppliers distanced from one another, and supplying core material to the molding space; a press-molder disposed between the raw material suppliers, and receiving the molding cast part where the core material is supplied through the raw material supplier, and pressing the molding space; and a carrier transferring the molding cast part after the core material is supplied by the raw material supplier and the molding space is press-molded by the press-molder.

In the general aspect of the system, the system may further comprise a receiver connected to the press-molder and receiving a core that is press-molded; wherein the carrier may transfer the molding cast part after the core is received in the receiver.

In the general aspect of the system, the carrier may move the molding cast part back and forth along the direction the molding cast parts are disposed.

In the general aspect of the system, the molding cast part may comprise a frame closing an exterior surface of the molding space; a lower molding plate provided on a lower side of the frame so that it can be moved up and down; and a lower presser pressing the lower molding plate.

In the general aspect of the system, the press-molder may comprise an upper presser provided on an upper side of the molding cast part and pressing the molding space; an upper presser connected to the upper molding plate and pressing the upper molding plate; and a plurality of guides penetrating the upper molding plate along a gravity direction and guiding a movement path of the upper molding plate.

In the general aspect of the system, the supplying core material by the raw material supplier and the press-molding of the molding space by the press-molder may be performed at the same time.

In the general aspect of the system, the number of molding cast parts may be one more than the number of the raw material suppliers and the number of the press-molders combined.

In the general aspect of the system, the molding cast part may be provided on only one of the raw material suppliers disposed on both ends along a movement direction of the molding cast part, and only one of the raw material suppliers may provide core material to the molding space.

According to the present disclosure, there is provided a system for manufacturing a core of a vacuum insulation panel that is capable of repeatedly performing a simple process so as to mass produce cores.

Furthermore, it is possible to inhibit deformation of a core caused by the spring back effect etc. thereby efficiently producing enlarged cores.

In addition, it is possible to reduce the time of manufacturing a core by simplifying the manufacturing process of a core.

Furthermore, by reducing the size of an apparatus for manufacturing a core, the installation space is not limited.

Other features and aspects may be apparent from the following detailed description, the drawings, and the claims.

BRIEF DESCRIPTION OF THE DRAWINGS

FIG. 7 is a schematic view of a core which is molded in a system for manufacturing a core of a vacuum insulation panel according to FIG. 2 being detached from a molding space.

FIG. 8 is a schematic view of a molding cast part being transferred through a carrier in a system for manufacturing a core of a vacuum insulation panel according to FIG. 2.

Figure 1:
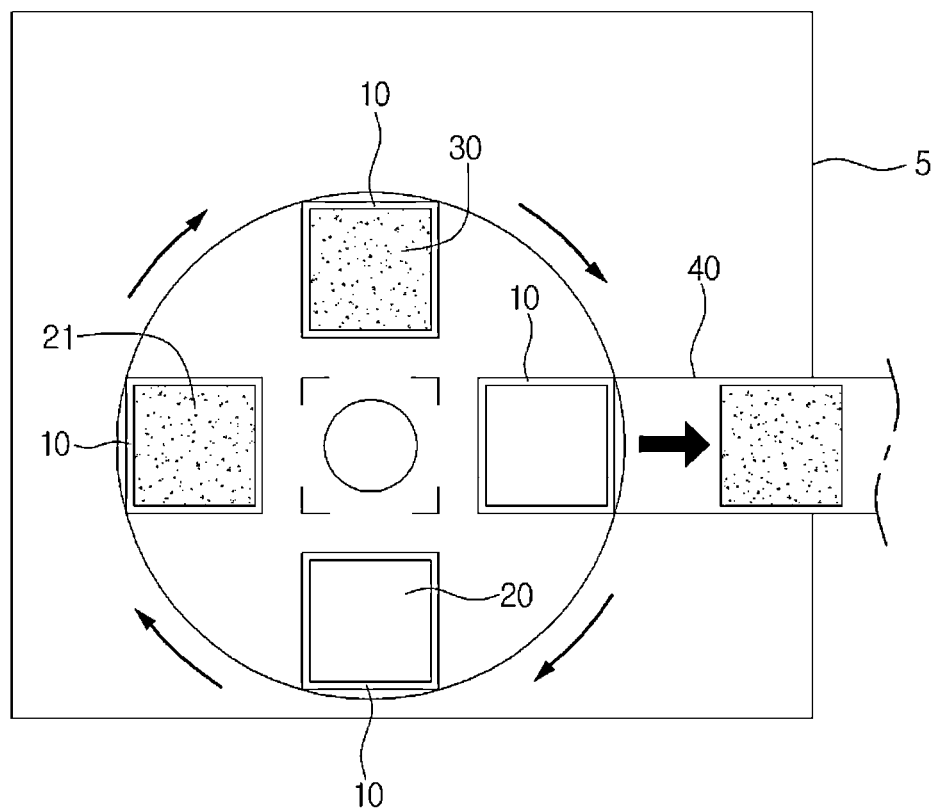
FIG. 1 is a schematic view of an apparatus for manufacturing a core of a vacuum insulation panel according to prior art.

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Herein below is detailed description of a system for manufacturing a core of a vacuum insulation panel according to an exemplary embodiment of the present disclosure with reference to the drawings attached hereto.

Figure 2:
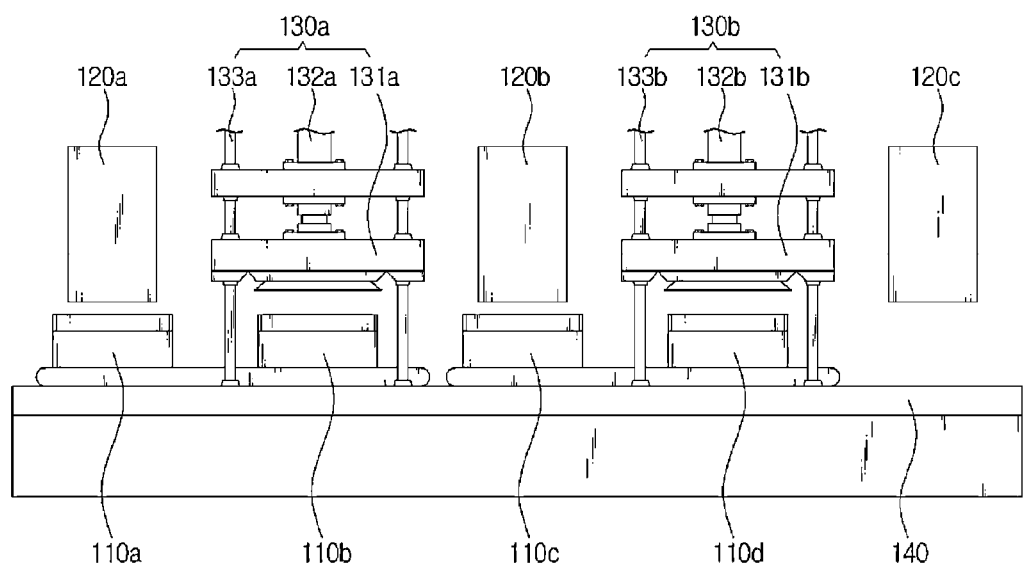
FIG. 2 is a schematic view of a system for manufacturing a core of a vacuum insulation panel according to an exemplary embodiment of the present disclosure.
Figure 3:
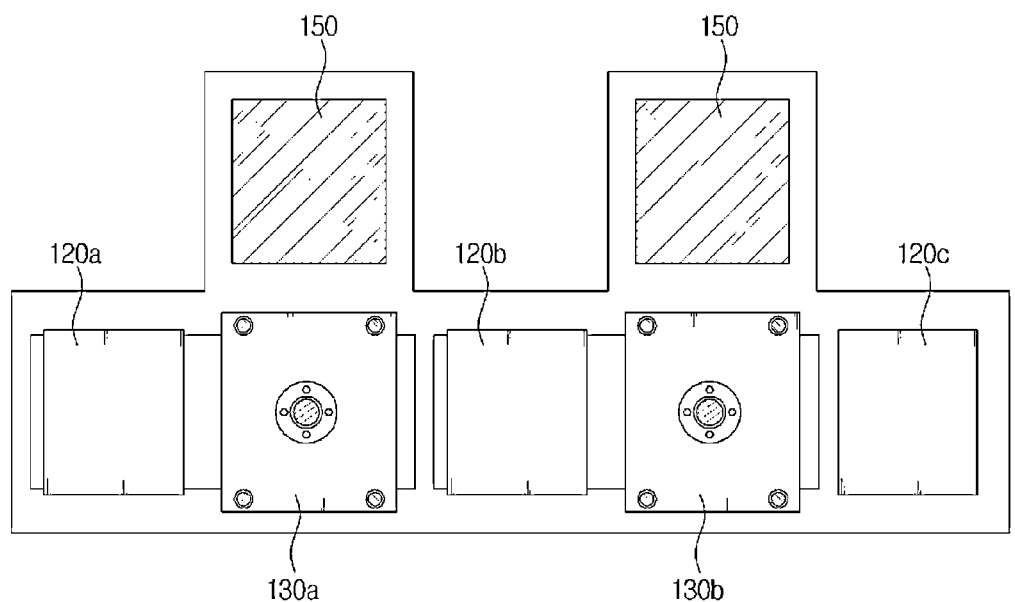
FIG. 3 is a schematic view of a system for manufacturing a core of a vacuum insulation panel according to FIG. 2.

FIG. 2 is a schematic view of a system for manufacturing a core of a vacuum insulation panel according to an exemplary embodiment of the present disclosure, and FIG. 3 is a schematic view of a system for manufacturing a core of a vacuum insulation panel according to FIG. 2.

With reference to FIGS. 2 and 3, a system 100 for manufacturing a core of a vacuum insulation panel according to an exemplary embodiment of the present disclosure comprises a molding cast part 110, raw material provider 120, press-molder 130, carrier 140, and receiver 150, and is capable of supplying core material to different molding cast parts and pressing the core material at the same time, and then providing the core material to an adjacent press-molder and the raw material supplier through the carrier, thereby pressing and supplying the core material at the same time so as to reduce the time of manufacturing a core.

The molding cast part 110 is provided in plural disposed along one direction, and provides a molding space M where core material is supplied and pressed. The molding cast part 110 comprises a lower molding plate 111, frame 112, and lower presser 113.

When provided on the raw material supplier 120 to be explained Herein below, the lower molding plate 111 is provided with core material on the upper surface, and when provided on the press-molder 130 to be explained Herein below, the lower molding plate 111 is a plate member that transmits the pressing force from the lower direction to the core material provided on the upper surface.

In other words, when the molding cast part 110 is provided with core material from the raw material supplier 120 to be explained Herein below, the lower molding plate 111 is provided with core material on its upper surface and then the core material is prepared ready to be pressed by the press-molder 130 to be explained Herein below.

Meanwhile, there may be further performed a planarization process for planarizing the upper portion of the core material.

The frame 112 accommodates the lower molding plate 111, and closes the exterior surface of the molding space M from outside, but when the core material is pressed by the press-molder 130 to be explained Herein below, supports the pressure applied to the core material and determines the shape of the core.

According to an exemplary embodiment of the present disclosure, the frame 112 may be provided as a square cast where its upper side and lower side are open.

The lower presser 113 applies pressure to the lower molding plate 111 to press the core material.

That is, the lower presser 113 is connected to the lower molding plate 111 to send the force to the lower molding pate 111 so that the lower molding plate 111 can move upwards, and when the movement of the lower molding plate 111 is limited by the core material and the upper molding plate 131 to be explained Herein below, the lower presser presses the core material with the force sent to the lower molding plate 111.

Meanwhile, according to an exemplary embodiment of the present disclosure, when moving the press-molded core to the frame 112, more exactly to the exterior of the molding space M, the lower molding plate 111 and the upper molding plate 131 to be explained Herein below move in the same direction while maintaining a practically same distance from each other.

To embody the aforementioned, the lower presser 113 may desirably be a hydraulic cylinder of a servo-control system or comprise a servo motor and ball screw.

Herein, in the case where the lower presser 113 is a hydraulic cylinder of a servo-control system, it is possible to make fine manipulation of 0.1 mm unit, and thus it is possible to control fine movements of the lower molding plate 111.

In addition, in the case where the lower presser 113 is a servo-motor and ball screw, it is also possible to make fine manipulation as aforementioned, and thus it is possible to control fine movements of the lower molding plate 111 as well.

Figure 4:
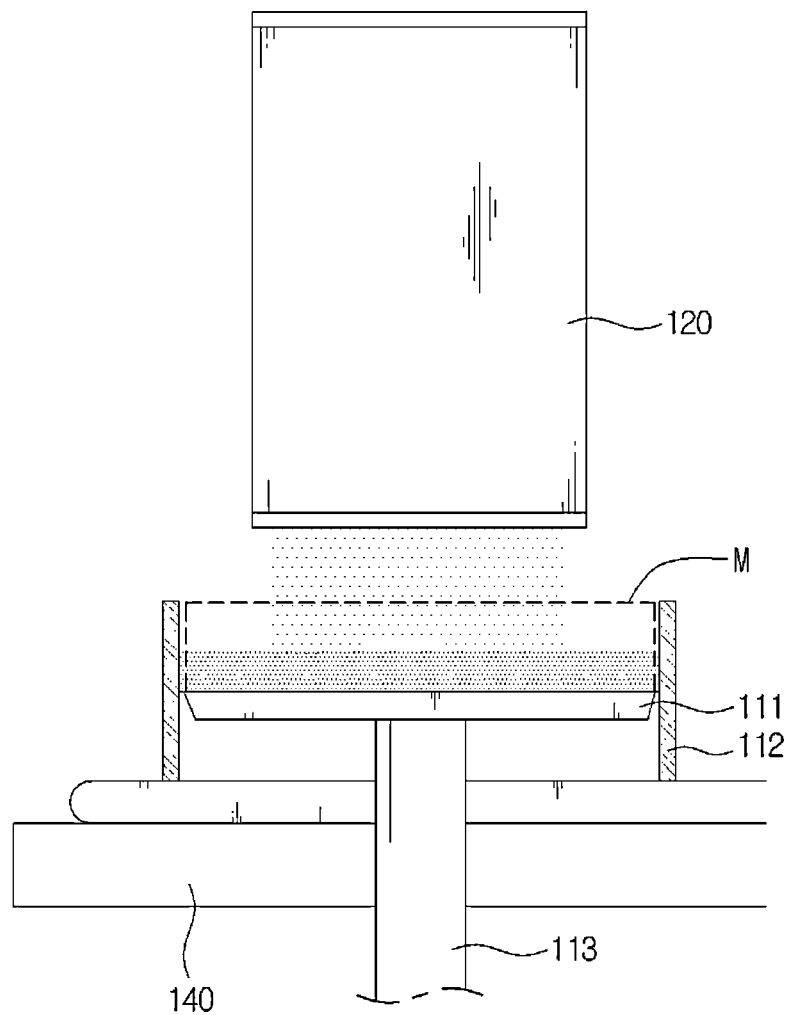
FIG. 4 is a schematic view of supplying core material to a molding space by a raw material supplier in a system for manufacturing a core of a vacuum insulation panel according to FIG. 2.

FIG. 4 is a schematic view of supplying core material to a molding space through a raw material supplier in a system for manufacturing a core of a vacuum insulation panel according to FIG. 2.

With reference to FIG. 4, the raw material supplier 120 is provided on the upper side of the molding cast part 110 to provide core material to the molding space M.

Meanwhile, the raw material supplier 120 is a well-known technology, and thus detailed explanation thereof is omitted.

However, it is desirable that the raw material supplier 120 supplies core material from an area corresponding to the upper surface of the lower molding plate 111 so that the core material can be evenly dispersed on the upper surface of the lower molding plate 111.

In addition, an additional planarizer (not illustrated) may be provided to evenly planarize the core material.

Figure 5:
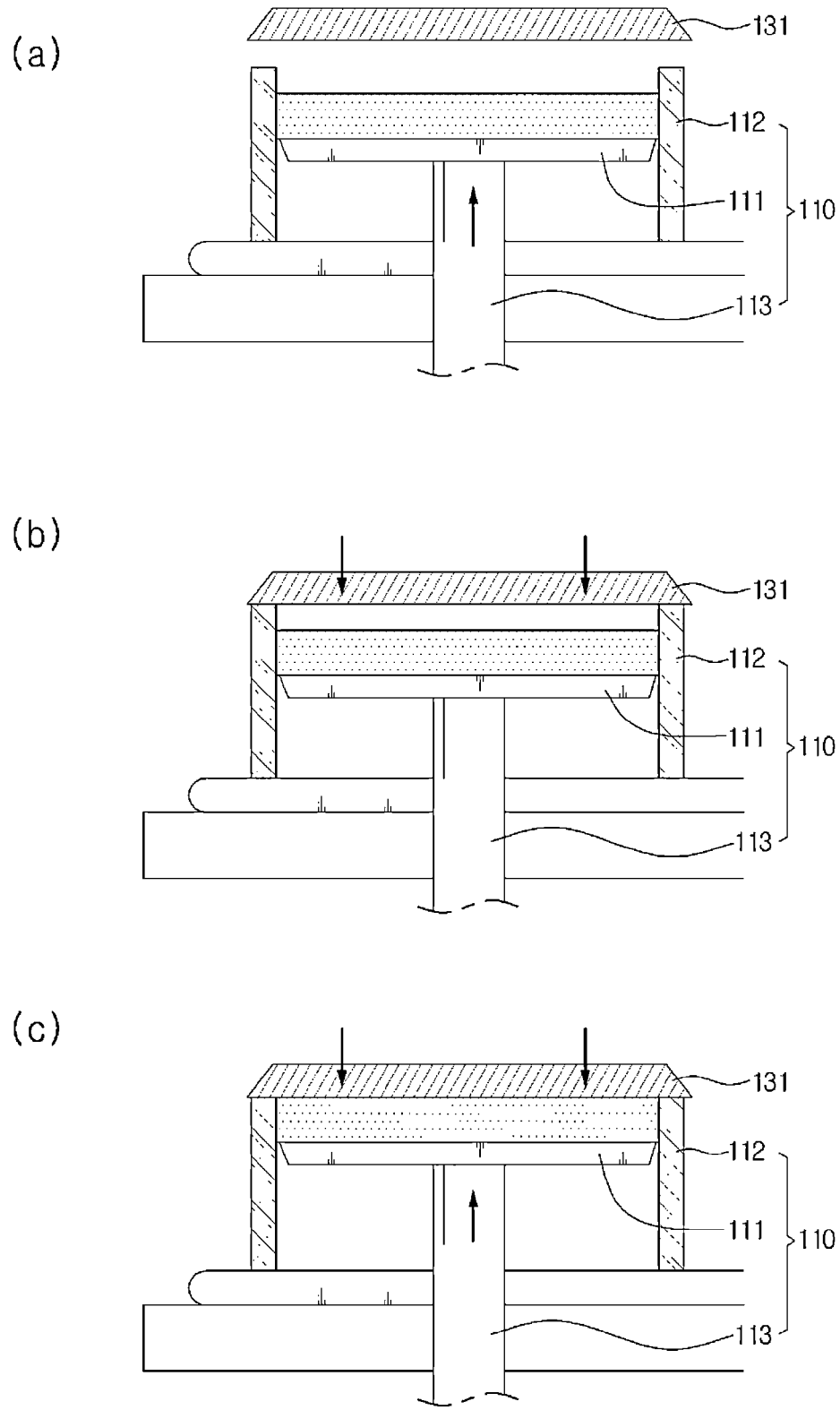
FIG. 5 is a schematic view of core material being press-molded by a press-molder in a system for manufacturing a core of a vacuum insulation panel according to FIG. 2.
Figure 6:
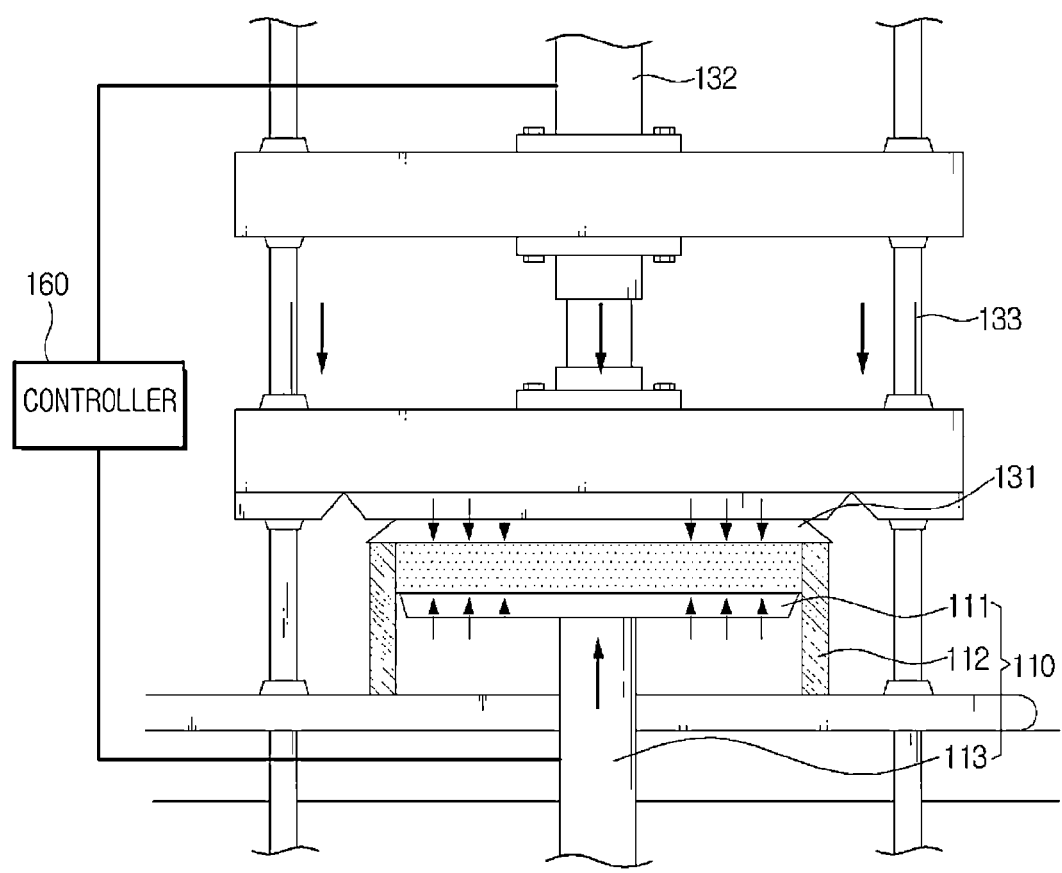
FIG. 6 is a schematic view of an upper molding plate and lower molding plate being synchronization-controlled in a system for manufacturing a core of a vacuum insulation panel according to FIG. 5.

FIG. 5 is a schematic view of core material being press-molded by a press-molder in a system for manufacturing a core of a vacuum insulation panel according to FIG. 2, and FIG. 6 is a schematic view of an upper molding plate and lower molding plate being synchronization-controlled in a system for manufacturing a core of a vacuum insulation panel according to FIG. 5.

With reference to FIGS. 5 to 7, the press-molder 130 is provided on the upper side of the molding cast part 110 but between the raw material supplier 120, and is configured to receive the molding cast part 110 where the core material is supplied to the molding space M through the raw material supplier 120 and to press the molding space M. The press-molder 130 comprises an upper molding plate 131, upper presser 132, and a guide 133.

The upper molding plate 131 is a member provided on the upper side of the molding cast part 110 to close the upper side of the frame 112.

According to the exemplary embodiment of the present disclosure, the cross-sectional area of the surface on the molding plate 131 facing the molding cast part 110 is bigger than the cross-sectional area of the molding cast part 110.

The upper presser 132 is connected to the upper molding plate 131 and applies force to the upper molding plate 131.

That is, when the force is applied to the upper molding plate 131 through the upper presser 132, the upper molding plate 131 moves downwards, and in the exemplary embodiment of the present disclosure, the upper molding plate 131 moves until the lower surface contacts the frame 112 and closes the upper side of the frame 112.

According to the exemplary embodiment of the present disclosure, the upper presser 132 may be a hydraulic cylinder of a servo-control system or comprise a servo-motor and ball screw just as in the lower presser 113 to make fine manipulations of the movement of the upper molding plate 131.

In addition, in the exemplary embodiment of the present disclosure, the upper molding plate 131 contacts the frame 112, and thus when the upper side of the frame 112 is closed, the lower molding plate 111 moves upwards to press the core material.

A plurality of guides 133 are extended in a gravity direction but to penetrate the upper molding plate 131, thereby guiding the movement of the upper molding plate 131 so that the upper molding plate 131 can move in a gravity direction.

For the core to be manufactured in a predetermined shape, more specifically, in a shape practically the same as the shape of the molding space M, a predetermined pressure must be applied with the location of the core material secured, and when the upper molding plate 131 makes a movement other than along the gravity direction, the location of the core material may change during the press-molding.

Therefore, in the exemplary embodiment of the present disclosure, in the case where a plurality of guides 133 that extend along the gravity direction that is perpendicular to the upper surface of the core material guide the movement path of the upper molding plate 133, the upper molding plate 131 may be guided to make only the movements perpendicular to the upper surface of the core material.

However, the movement of the upper molding plate 131 through the guide 133 may obviously be adjusted differently according to the shape of the core material.

In addition, when discharging the press-molded core from the molding space M, the spring back effect may occur, that is a phenomenon where the volume increases due to the air gap inside the core and the elasticity of the core material itself, and thus, in consideration of this spring back effect, it is possible to provide the distance between the lower molding plate 111 and upper molding plate 131 that is narrower than the thickness of the predetermined core in the process of press-molding in the press-molder 130.

FIG. 8 is a schematic view of a molding cast part being transferred through a carrier in a system for manufacturing a core of a vacuum insulation panel according to FIG. 2.

With reference to FIG. 8, the carrier 140 is disposed on the lower side of the raw material supplier 120 and the press-molder 130, and supplies the core material and transfers the plurality of molding cast parts 110 that are press-molded to the press-molder 130 and to the raw material supplier 120.

Herein, the carrier 140 transfers the molding cast part 110 along one direction in which the molding cast parts 110 are disposed. The molding cast part 110 that is supplied with raw material through the raw material supplier 120 is transferred to the press-molder 130, and the molding cast part 140 that discharged the core molded in the press-molder 130 to the receiver 150 to be explained Herein below is transferred to the raw material supplier 120.

The receiver 150 is a place connected to the press-molder 130 where the press-molded core is received through the press-molder 130.

That is, since the molding cast part 110 that completed the process in the press-molder 130 must be provided to the raw material supplier 120 and receive core material, it is desirable to discharge the molded core from the molding space M.

Consequently, the completed core is taken out from the molding space M, and the molding cast part 110 is transferred from the press-molder 130 to the raw material supplier 120 to be supplied with core material.

Meanwhile, in the exemplary embodiment of the present disclosure, the molded core receives force so as to move as high as the lower molding plate 111 is exposed from the frame 112 and then to move towards the receiver 150.

Meanwhile, in the exemplary embodiment of the present disclosure, a controller 160 may be further provided to perform a synchronized control on the movement of the lower molding plate 111 and upper molding plate 131.

Herein, a synchronization control is a method of making a precise control of the flow of controls between the processes when a plurality of processes are being made within a particular period of time.

That is, for the lower molding plate 111 and upper molding plate 131 to move while maintaining a certain the distance there between, as the lower molding plate 111 moves a predetermined length through the lower presser 113, the upper molding plate 131 must move a predetermined length through the upper presser 132 at the same time.

Therefore, by making a precise control of the movement of the upper molding plate 131 and lower molding plate 111 through the synchronization control by the controller 160, it becomes possible to move the upper molding plate 131 and lower molding plate 111 in the same direction while maintaining practically the same distance there between.

Herein below is detailed explanation on a combination relationship between the molding cast part 110, raw material supplier 120, press-molder 130, carrier 140, and receiver 150.

With reference to FIG. 2 or FIG. 3, the system for manufacturing a core of a vacuum insulation panel according to an exemplary embodiment of the present disclosure comprises three raw material suppliers 120 distanced from one another, two press-molders 130 disposed between the raw material suppliers 120, and four molding cast parts 110.

That is, the aforementioned are disposed in the order of the first raw material supplier 120a, followed by first press-molder 130a, followed by second raw material supplier 120b, followed by second press-molder 130b, and followed by third raw material supplier 120c, and on the lower end of the first raw material supplier 120a to the second press-molder 130b, the molding cast parts 110a, 110b, 110c, 110d are provided.

Herein, for convenience of explanation, the direction from the first raw material supplier 120a towards the third raw material supplier 120c is defined as a first direction, while the direction from the third raw material supplier 120c towards the first raw material supplier 120a is defined as a second direction.

Meanwhile, it is desirable that the first raw material supplier 120a, first press-molder 130a, second raw material supplier 120b, second press-molder 130b, and third raw material supplier 120c are disposed by an equal distance from one another so as to efficiently transfer the molding cast part 110 through the carrier 140.

In addition, the number of the molding cast parts 110 may be one less than the number of the raw material supplier 120 and the number of the press-molder 130 combined, and the molding cast parts 130 may be disposed successively along the first direction.

This is to perform the process of manufacturing a core successively, and depending on the transferring direction of the molding cast parts 110, only one of the first raw material supplier 120a and third raw material supplier 120c is selectively operated.

That is, the first raw material supplier 120a and third raw material supplier 120c perform their original function of supplying the core material to the molding space M only when the molding cast parts 110 are provided on the lower portion thereof, and the number of the molding cast parts 110 are one less than the number of the raw material supplier 120 and the number of the press-molder 130 combined, and thus the molding cast part 110 is disposed on the lower portion of only one of the two, so that the first raw material supplier 120a and third raw material supplier 120c do not operate at the same time.

Before the molding cast part 110 is transferred, the fourth molding cast part 110d is not disposed on the lower side of the third raw material supplier 120c, and thus the third raw material supplier 120c does not operate, and in the case where the molding cast part 110 is transferred in the first direction by the carrier 140, the first molding cast part 110a that had been disposed in the lower side of the first raw material supplier 120a is transferred to the lower side of the first press-molder 130a, and thus the first raw material supplier 120a does not operate.

In addition, in the case where the molding cast part 110 is transferred in the second direction through the carrier 140, the third raw material supplier 120c does not operate as in the initial state, but repeats the aforementioned process according to the operation of the carrier 140.

Meanwhile, the carrier 140 is disposed on the lower side of the molding cast part 110 to support the molding cast part 110.

In addition, the receiver 150 is provided on the front or rear side of where the press-molder 130 is to be installed to provide a place for receiving the press-molded core, and as long as it is located within a range that does not affect transferring the molding cast part 110, there is no particular limitation to the location.

Meanwhile, the aforementioned is merely an exemplary embodiment of the present disclosure for convenience of explanation, and there is no limitation to the specific numbers, or installation location thereof.

Herein below is explanation on operating an exemplary embodiment of the aforementioned system for manufacturing a core of a vacuum insulation panel.

FIG. 8 is a schematic view of a molding cast part being transferred through a carrier in a system for manufacturing a core of a vacuum insulation panel according to FIG. 2.

Herein below is explanation on operating an exemplary embodiment of the present disclosure with reference to FIG. 8, with a case where there is a molding cast part 110a on the lower portion of the first raw material supplier 120a defined as a first state, and a case where there is a molding cast part 110d on the lower portion of the third raw material supplier 120c defined as a second state.

At the first state, each of the first molder 110a and third molder 110c is supplied with core material in the molding space M thereof through the first raw material supplier 120a and second raw material supplier 120b.

In an exemplary embodiment of the present disclosure, there may be further included a planarization process of planarizing the core material provided in the first molding cast part 110a and the third molding cast part 110c after being supplied with the core material in each of the molding space M of the first raw material supplier 120a and second raw material supplier 120b.

In addition, the second molding cast part 110b and the fourth molding cast part 110d perform a process where the core material provided in the molding space M is pressed and then the core is press-molded by the first press-molder 130a and the second press-molder 130b.

Herein, the process where the core is press-molded by the first press-molder 130a and the second press-molder 130b may comprise a step of moving the lower molding plate 111 upwards up to a predetermined location with the upper side opened, moving the upper molding plate 131 downwards to contact the frame 112 once the lower molding plate 111 reaches the predetermined location, and a step of moving the lower molding plate 111 upwards to press the core material inside the molding space M.

Furthermore, the step of moving the lower molding plate 111 downwards to contact the frame 112 once the lower molding plate 111 reaches the predetermined location and the step of moving the lower molding plate 111 upwards to press the core material inside the molding space M may be performed either successively or simultaneously.

When a press-molding process is performed as aforementioned, the lower molding plate 111 would move upwards with the upper side opened, and thus the movement of the lower molding plate 111 would not be limited by the resistance of air, thereby reducing the time for the press-molding process.

Meanwhile, it is desirable to provide a distance between the lower molding plate 111 and upper molding plate 131 that is smaller than the predetermined thickness, considering that the volume of the core would increase by the spring back effect.

Herein, the extent of increase of the core by the spring back effect was measured to be approximately 10% to 15% after one hour, and thus considering this measurement result, the distance between the lower molding plate 111 and the upper molding plate 131 may be provided to be approximately 85% to 90% of the predetermined thickness of the core.

Meanwhile, each of the molding cast parts 110a, 110b, 110c, 110d performs supplying the core material and press-molding the core material at the same time according to each location.

Herein, supplying the core material and press-molding the core material at the same time does not necessarily mean starting and finishing the supplying of the core material at the same time as the press-molding process, but means that each molding cast part 110 performs the process of supplying the raw material and press-molding the raw material on the lower side of the raw material supplier 120 or press-molder 130 until the molding cast part 110 is transferred by the carrier 140.

That is, the process of press-molding the core material may be continued in each molding space M of the second molding cast part 110b and the fourth molding cast part 110d even when the supplying of the core material in each molding space M of the first molding cast part 110a and third molding cast part 110c is completed, and the first molding cast part 110a and the third molding cast part 110c wait for until the process in the second molding cast part 110b and the fourth molding cast part 110d are completed.

Herein, the first molding cast part 110a and third molding cast part 110c may perform a planarization process of the core material until the process in the second molding cast part 110b and the fourth molding cast part 110d are completed.

Meanwhile, the point where the process in the second molding cast part 110b and the fourth molding cast part 110d is completed included the process where the press-molding is completed and where the press-molded core is discharged towards the receiver 150 side.

Herein, the first state may include an initially driven state, in which case the second molding cast part 110b and the fourth molding cast part 110d are empty and are not provided with core material in each molding space M. Therefore, in this case only, operating the first press-molder 130a and the second press-molder 130b is excluded.

Furthermore, on the lower portion of the third raw material supplier 120c, no molding cast part 110 is provided, and thus operating the third raw material supplier 120c is excluded as well.

Meanwhile, with each process completed through the first raw material supplier 120a, first press-molder 130a, second raw material supplier 120b, and second press-molder 130b, the carrier 140 transfers each molding cast part 110 along the first direction.

Herein, the distance made by the carrier 140 is determined by the distance between the first raw material supplier 120a and the first press-molder 130a, and in the exemplary embodiment of the present disclosure, the distance between each raw material supplier 120 and press-molder 130 will be the same, and thus will be converted into a second state by transferring of the carrier 140 along the first direction.

Upon reaching the second state, each of the molding cast parts 110a, 110b, 110c, 110d is provided to the first press-molder 130a, second raw material supplier 120b, second press-molder 130b, and third raw material supplier 120c, respectively.

That is, at the first state, the first molding cast part 110a that is provided with the core material from the first raw material supplier 120a is transferred to the lower portion of the first press-molder 130a to perform a press-molding process of the core material, and the second molding cast part 110b is provided to the second raw material supplier 120b with the press-molded core discharged from the first press-molder 130a to the receiver 150 so as to receive core material inside the empty molding space M.

Herein, operating the third molding cast part 110c and the fourth molding cast part 110d are the same as operating the first molding cast part 11a and the second molding cast part 110d, respectively, and thus detailed explanation thereof is omitted.

However, since the fourth molding cast part 110d is provided on the lower portion of the third raw material supplier 120c, unlike at the first state, the process of supplying raw material to the fourth molding cast part 110d is performed, and since no molding cast part 110 is provided on the lower portion of the first raw material supplier 120a, operation thereof is excluded.

Meanwhile, when a molding cast part 110 is provided on the lower portion of each of the first press-molder 130a, second raw material supplier 120b, second press-molder 130b, and third raw material supplier 120c, the carrier 140 transfers the molding cast part 110 in the second direction, converting the first press-molder 130a, second raw material supplier 120b, second press-molder 130b, and third raw material supplier 120c into a first state.

Herein, operation under a first state is as mentioned above, and thus detailed description is omitted, and in the system for manufacturing a core of a vacuum insulation panel according to an exemplary embodiment of the present disclosure repeatedly performs the first state and second state, so as to manufacture a core.

In the case of repeatedly performing the first state and second state once, the number of cores would be 4, and if the system for manufacturing a core of a vacuum insulation panel is enlarged, a core manufactured by repeatedly performing the first state and second state once would become larger.

This becomes clear upon reviewing the comparison table below comparing the continuously rotating molding apparatus disclosed in Korean Laid-open Patent Publication no. 10-2010-0090008 with the system for manufacturing a core of a vacuum insulation panel according to the exemplary embodiment of the present disclosure regarding the time spent in producing a unit of area.

TABLE 1

| Patent | Production time per unit | Time spent in manufacturing a core of a unit of area(1 m²) |
|---|---|---|
| Korean Laid-open Patent Publication no. 10-2010-0090008 | 185 | 234 |
| Present invention | 175 | 73 |

That is, while the production time necessary in manufacturing one core by a continuous rotating molding apparatus disclosed in Korean Laid-open Patent Publication no. 10-2010-0090008 is 185 sec, and the time necessary in manufacturing a core of a unit of area is 234 sec/m², the time necessary in manufacturing one core by the system 100 for manufacturing a core of a vacuum insulation panel according to an exemplary embodiment of the present disclosure is 175 sec, and the time necessary in manufacturing a core of a unit of area is 73 sec/m². In other words, when using the system for manufacturing a core of a vacuum insulation panel, the production time per unit is reduced and the production area is improved by approximately 3 times compared to the continuous rotating molding apparatus disclosed in Korean Laid-open Patent Publication no. 10-2010-0090008.

Herein, if a system 100 for manufacturing a core of a vacuum insulation panel of the present disclosure is enlarged and more raw material suppliers 120 and press-molders 130 corresponding to the increased number of raw material suppliers 120 are further included, it is possible to further reduce the time necessary in manufacturing a core of a unit of area, thereby becoming capable of mass producing cores within a reduced time.

A number of examples have been described above. Nevertheless, it will be understood that various modifications may be made. For example, suitable results may be achieved if the described techniques are performed in a different order and/or if components in a described system, architecture, device, or circuit are combined in a different matter and/or replaced or supplemented by other components or their equivalents. Accordingly, other implementations are within the scope of the following claims.

DESCRIPTION OF REFERENCE NUMERALS

100: SYSTEM FOR MANUFACTURING CORE OF VACUUM INSULATION PANEL
110: MOLDING CAST PART
120: RAW MATERIAL SUPPLIER
130: PRESS-MOLDER
140: CARRIER
150: RECEIVER
160: CONTROLLER

What is claimed is:

1. A system for manufacturing a core of a vacuum insulation panel, the system comprising:
a plurality of raw material suppliers distanced from one another, and supplying core material;
a plurality of molding cast parts disposed along one direction, and providing a molding space for the core material to be supplied and press-molded;
a plurality of press-molders disposed between the raw material suppliers, and pressing the molding space; and
a carrier transferring the molding cast parts after the core material is press-molded;
wherein the system is configured to perform supplying of the core material by the plurality of raw material suppliers and press-molding of the molding space by the plurality of press-molders at the same time;
wherein the carrier is configured to move the plurality of molding cast parts back and forth along the direction in which the molding cast parts are disposed, in such a manner that after the supplying of the core material and the press-molding of the molding space are completed, the plurality of molding cast parts move to adjacent press-molders and adjacent raw material suppliers; and
wherein the system is configured to planarize the core material at the molding cast parts to which the core material is supplied by the raw material suppliers until a press-molding of the core material is completed in the molding space of the molding cast parts.

2. The system according to claim 1, further comprising a receiver connected to the press-molder and receiving a core that is press-molded.

3. The system according to claim 1,
wherein the molding cast part comprises:
a frame closing an exterior surface of the molding space;
a lower molding plate provided on a lower side of the frame so that it can he moved up and down; and
a lower presser pressing the lower molding plate.

4. The system according to claim 1,
wherein the press-molder comprises:
an upper presser provided on an upper side of the molding cast part and pressing the molding space;
an upper presser connected to the upper molding plate and pressing the upper molding plate; and
a plurality of guides penetrating the upper molding plate along a gravity direction and guiding a movement path of the upper molding plate.

5. The system according to claim 2,
wherein the supplying core material by the raw material supplier and the press-molding of the molding space by the press-molder are performed at the same time.

6. The system according to claim 3,
wherein the supplying core material by the raw material supplier and the press-molding of the molding space by the press-molder are performed at the same time.

7. The system according to claim 4,
wherein the supplying core material by the raw material supplier and the press-molding of the molding space by the press-molder are performed at the same time.

8. The system according to claim 1,
wherein the number of molding cast parts is one more than the number of the raw material suppliers and the number of the press-molders combined.

9. The system according to claim 8,
wherein the molding cast part is provided on only one of the raw material suppliers disposed on both ends along a movement direction of the molding cast part, and only one of the raw material suppliers provides core material to the molding space.

10. The system according to claim 2, wherein the number of molding cast parts is one more than the number of the raw material suppliers and the number of the press-molders combined.

11. The system according to claim 10,
wherein the molding cast part is provided on only one of the raw material suppliers disposed on both ends along a movement direction of the molding cast part, and only one of the raw material suppliers provides core material to the molding space.

12. The system according to claim 3, wherein the number of molding cast parts is one more than the number of the raw material suppliers and the number of the press-molders combined.

13. The system according to claim 12, wherein the molding cast part is provided on only one of the raw material suppliers disposed on both ends along a movement direction of the molding cast part, and only one of the raw material suppliers provides core material to the molding space.

14. The system according to claim 4, wherein the number of molding cast parts is one more than the number of the raw material suppliers and the number of the press-molders combined.

15. The system according to claim 14, wherein the molding cast part is provided on only one of the raw material suppliers disposed on both ends along a movement direction of the molding cast part, and only one of the raw material suppliers provides core material to the molding space.

\* \* \* \* \*